US011943698B2

(12) United States Patent
Baek et al.

(10) Patent No.: US 11,943,698 B2
(45) Date of Patent: Mar. 26, 2024

(54) METHOD FOR PROVIDING SUBSCRIPTION INFORMATION ON NON-PUBLIC NETWORKS TO TERMINAL

(71) Applicant: Samsung Electronics Co., Ltd., Suwon-si (KR)

(72) Inventors: Youngkyo Baek, Suwon-si (KR); Sangjun Moon, Suwon-si (KR); Jungshin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 17/598,741

(22) PCT Filed: Mar. 27, 2020

(86) PCT No.: PCT/KR2020/004169
§ 371 (c)(1),
(2) Date: Sep. 27, 2021

(87) PCT Pub. No.: WO2020/204475
PCT Pub. Date: Oct. 8, 2020

(65) Prior Publication Data
US 2022/0201593 A1 Jun. 23, 2022

(30) Foreign Application Priority Data

Mar. 29, 2019 (KR) .................. 10-2019-0037143

(51) Int. Cl.
*H04W 48/10* (2009.01)
*H04W 8/18* (2009.01)
(Continued)

(52) U.S. Cl.
CPC ............. *H04W 48/10* (2013.01); *H04W 8/18* (2013.01); *H04W 12/06* (2013.01); *H04W 60/00* (2013.01); *H04W 76/10* (2018.02)

(58) Field of Classification Search
CPC ..... H04W 48/10; H04W 48/12; H04W 48/18; H04W 8/02; H04W 8/18; H04W 8/205;
(Continued)

(56) References Cited

U.S. PATENT DOCUMENTS 10,645,566 B2    5/2020  Baek et al.
11,160,007 B2 *  10/2021 Kim ..................... H04W 76/27
(Continued)

FOREIGN PATENT DOCUMENTS

CN       109417701 A      3/2019
KR       10-1663655 B1    10/2016
KR    10-2020-0019067 A    2/2020

OTHER PUBLICATIONS

Samsung, "Update of Solution #4: Support of NPN subscription", SA WG2 Meeting #129Bis, Nov. 26-30, 2018, S2-1812224, 6 pages.
(Continued)

*Primary Examiner* — Siu M Lee

(57) ABSTRACT

The present disclosure relates to a communication technique which combines a 5G communication system, for supporting a higher data transmission rate than 4G systems, with IoT technology, and a system for same. The present disclosure may be applied to intelligent services (for example, smart homes, smart buildings, smart cities, smart cars or connected cars, health care, digital education, retailers, security and safety-related services, or the like) on the basis of 5G communication technology and IoT-related technology. Disclosed is a method for providing subscription information about non-public networks to a terminal in a wireless communication system.

15 Claims, 9 Drawing Sheets

(51) Int. Cl.
*H04W 12/06* (2021.01)
*H04W 60/00* (2009.01)
*H04W 76/10* (2018.01)

(58) Field of Classification Search
CPC ..... H04W 12/06; H04W 60/00; H04W 76/10; H04W 4/50; H04W 84/045; H04W 84/105
See application file for complete search history.

(56) References Cited

U.S. PATENT DOCUMENTS

| | | | |
|---|---|---|---|
| 2015/0105075 A1 | 4/2015 | Yu et al. | |
| 2019/0037516 A1 | 1/2019 | Kim et al. | |
| 2020/0374352 A1* | 11/2020 | Ge | H04L 65/611 |
| 2021/0345226 A1* | 11/2021 | Liao | H04W 48/18 |
| 2022/0086748 A1* | 3/2022 | Qiao | H04W 8/08 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.2.0 (Mar. 2019), 418 pages.

Vivo, "Solution for accessing to Non Public Network services via PLMN", SA WG2 Meeting #129, Oct. 15-19, 2018, S2-1810200, 6 pages.

Qualcomm Inc. et al., "TS 23.501: Introducing Non-public network", Change Request, 3GPP TSG-SA2 Meeting #131, Feb. 25-Mar. 1, 2019, S2-1902812, 11 pages.

International Search Report dated Jul. 2, 2020 in connection with International Patent Application No. PCT/KR2020/004169, 2 pages.

Written Opinion of the International Searching Authority dated Jul. 2, 2020 in connection with International Patent Application No. PCT/KR2020/004169, 5 pages.

Supplementary European Search Report dated Apr. 13, 2022, in connection with European Application No. 20784900.1, 10 pages.

Nokia, et al., "Discussion of security solutions for SNPN service access via PLMN and vice versa," S3-190850 revision of S3-19xabc, 3GPP TSG-SA WG3 Meeting #94Ad-Hoc, Stockholm, Sweden, Mar. 11-15, 2019, 4 pages.

Samsung, "Discussion: UE registration to Non-Public NW," S2-1810584, SA WG2 Meeting #129, Dongguan, China, Oct. 15-19, 2018, 5 pages.

Decision of Patent dated Sep. 17, 2023, in connection with Korean Patent Application No. 10-2019-0037143, 9 pages.

* cited by examiner

METHOD FOR PROVIDING SUBSCRIPTION INFORMATION ON NON-PUBLIC NETWORKS TO TERMINAL

CROSS-REFERENCE TO RELATED APPLICATIONS

This application is a 371 of International Application No. PCT/KR2020/004169 filed on Mar. 27, 2020, which claims priority to Korean Patent Application No. 10-2019-0037143 filed on Mar. 29, 2019, the disclosures of which are herein incorporated by reference in their entirety.

BACKGROUND

1. Field

For a private communication network locally operated to provide communication services in a smart factory, etc., to operate a private cellular network (a private network or a non-public network or an NPN) locally configured separately from a common public cellular network is taken into consideration.

In particular, if a terminal moves between several private cellular networks, when the terminal attempts to use each private cellular network, there is a need for a scheme for previously providing the terminal with subscription data for accessing the private cellular network.

2. Description of Related Art

In order to satisfy wireless data traffic demands that tend to increase after 4G communication system commercialization, efforts to develop an enhanced 5G communication system or a pre-5G communication system are being made. For this reason, the 5G communication system or pre-5G communication system is called a beyond 4G network communication system or a post LTE system. In order to achieve a high data transfer rate, an implementation of the 5G communication system in a mmWave band (e.g., 60 Giga (60 GHz) band) is taken into consideration. In order to reduce a path loss of a radio wave and increase the transfer distance of a radio wave in the mmWave band, beamforming, massive MIMO, full dimensional MIMO (FD-MIMO), an array antenna, analog beamforming and large scale antenna technologies are being discussed in the 5G communication system. Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP), and reception interference cancellation, are being developed in the 5G communication system. In addition, hybrid FSK and QAM modulation (FQAM) and sliding window superposition coding (SWSC) that are advanced coding modulation (ACM) schemes, and filter bank multi-carrier (FBMC), non-orthogonal multiple access (NOMA) and sparse code multiple access (SCMA), that is, advanced access technologies, are being developed in the 5G system.

Meanwhile, the Internet evolves from a human-centered connection network over which human generates and consumes information to Internet of things (IoT) through which information is exchanged and processed between distributed elements, such as things. An Internet of everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, technologies, such as a sensor network, machine to machine (M2M) and machine type communication (MTC), are implemented by schemes, such as beamforming, MIMO, and an array antenna, that is, 5G communication technologies. The application of a cloud radio access network (cloud RAN) as the aforementioned big data processing technology may be said to be an example of convergence between the 5G technology and the IoT technology.

Recently, with the development of long term evolution (LTE) and LTE-Advanced, if a terminal moves between several private cellular networks, when the terminal attempts to use each private cellular network, there is a need for a method of previously providing the terminal with subscription data for accessing the private cellular network.

For a private communication network locally operated to provide communication services in a smart factory, etc., operating a private cellular network (a private network or a non-public network or an NPN) locally configured separately from a common public cellular network is taken into consideration.

A private cellular network may include a private cellular network using a public cellular network having a public network integrated NPN (or a non-standalone NPN) form, which consists of a data network name (DNN) or network slice instance(s) of the public cellular network, and a cellular network having a standalone NPN form, which is autonomously operated by a private cellular network without association with a public cellular network, depending on its operating method. Alternatively, there may be a cellular network having a standalone NPN form, which is operated by a public cellular network operator.

If a terminal needs to access several private cellular networks while moving, the contents of required subscription data need to be previously provided and stored in the terminal and unified data management (UDM) or a unified data repository (UDR) of a corresponding private cellular network, depending on the type of private cellular network to be accessed by the terminal. The present disclosure discloses a scheme for providing, by an application function (AF) operated by an NPN service provider, a smart factory operator, etc., UDM or a UDR with subscription data necessary for a private cellular network and deleting subscription data and a scheme for providing a corresponding terminal with subscription data (NPN subscription data) for a private cellular network and deleting subscription data.

SUMMARY

In an embodiment according to the present disclosure for solving problems, such as those described above, a method performed by a UE in a mobile communication system includes selecting a first standalone non-public network (SNPN) to be accessed based on information on the SNPN, which is broadcasted by a base station, transmitting, to a network entity of the first SNPN, a registration request message for accessing the selected first SNPN, transmitting, to the network entity, a packet data unit (PDU) session request message to request the establishment of a PDU session with the first SNPN, receiving, from the network entity, SNPN subscription data including a subscription credential of the UE for a second SNPN through the PDU session established in response to the PDU session request message, releasing registration with the first SNPN, selecting the second SNPN to be accessed based on the received SNPN subscription data, and being registered with the second SNPN by performing authentication on the second SNPN based on the subscription credential.

In another embodiment according to the present disclosure for solving problems, such as those described above, a method performed by a network entity of a first standalone non-public network (SNPN) in a mobile communication system includes receiving, from a UE, a registration request message for accessing a first SNPN, completing registration of the UE based on the registration request message, receiving, from the UE, a packet data unit (PDU) session request message to request the establishment of a PDU session with the first SNPN, establishing the PDU session in response to the PDU session request message, transmitting, to the UE, SNPN subscription data including a subscription credential of the UE for a second SNPN through the PDU session established in response to the PDU session request message, and releasing the registration of the UE. The UE selects the first SNPN to be accessed based on information on the first SNPN, which is broadcasted by a base station of the first SNPN. The UE selects the second SNPN to be accessed based on the SNPN subscription data transmitted to the UE and is registered with the second SNPN by performing authentication on the second SNPN based on the subscription credential.

In still another embodiment according to the present disclosure for solving problems, such as those described above, a UE for a mobile communication system includes a transceiver transmitting and receiving signals and a controller connected to the transceiver. The controller is configured to select a first standalone non-public network (SNPN) to be accessed based on information on the SNPN, which is broadcasted by a base station, transmit, to a network entity of the first SNPN, a registration request message for accessing the selected first SNPN, transmit, to the network entity, a packet data unit (PDU) session request message to request the establishment of a PDU session with the first SNPN, receive, from the network entity, SNPN subscription data including a subscription credential of the UE for a second SNPN through the PDU session established in response to the PDU session request message, release registration with the first SNPN, select the second SNPN to be accessed based on the received SNPN subscription data, and be registered with the second SNPN by performing authentication on the second SNPN based on the subscription credential.

In still another embodiment according to the present disclosure for solving problems, such as those described above, a network entity of a first standalone non-public network (SNPN) for a mobile communication system includes a transceiver transmitting and receiving signals and a controller connected to the transceiver. The controller is configured to receive, from a UE, a registration request message for accessing a first SNPN, complete registration of the UE based on the registration request message, receive, from the UE, a packet data unit (PDU) session request message to request the establishment of a PDU session with the first SNPN, establish the PDU session in response to the PDU session request message, transmit, to the UE, SNPN subscription data including a subscription credential of the UE for a second SNPN through the PDU session established in response to the PDU session request message, and release the registration of the UE. The UE selects the first SNPN to be accessed based on information on the first SNPN, which is broadcasted by a base station of the first SNPN. The UE selects the second SNPN to be accessed based on the SNPN subscription data transmitted to the UE and is registered with the second SNPN by performing authentication on the second SNPN based on the subscription credential.

If a private cellular network that needs to be accessed by a UE is fixed, corresponding subscription data has only to be previously stored in the UE and the UDR or UDM of the private cellular network. However, if a private cellular network that needs to be accessed by a UE is variously changed in response to a movement of the UE, corresponding subscription data needs to be provided and stored in the UE and the UDR or UDM of a cellular network according to circumstances. Furthermore, stored subscription data may need to be deleted, if necessary. The present disclosure has an effect in that a UE can use an NPN service consistently and smoothly although a private cellular network that needs to be accessed by the UE is changed by presenting a scheme for providing UDM or a UDR and the UE with NPN subscription data for each UE and deleting NPN subscription data depending on a form of the private cellular network.

DETAILED DESCRIPTION

Figure 1:
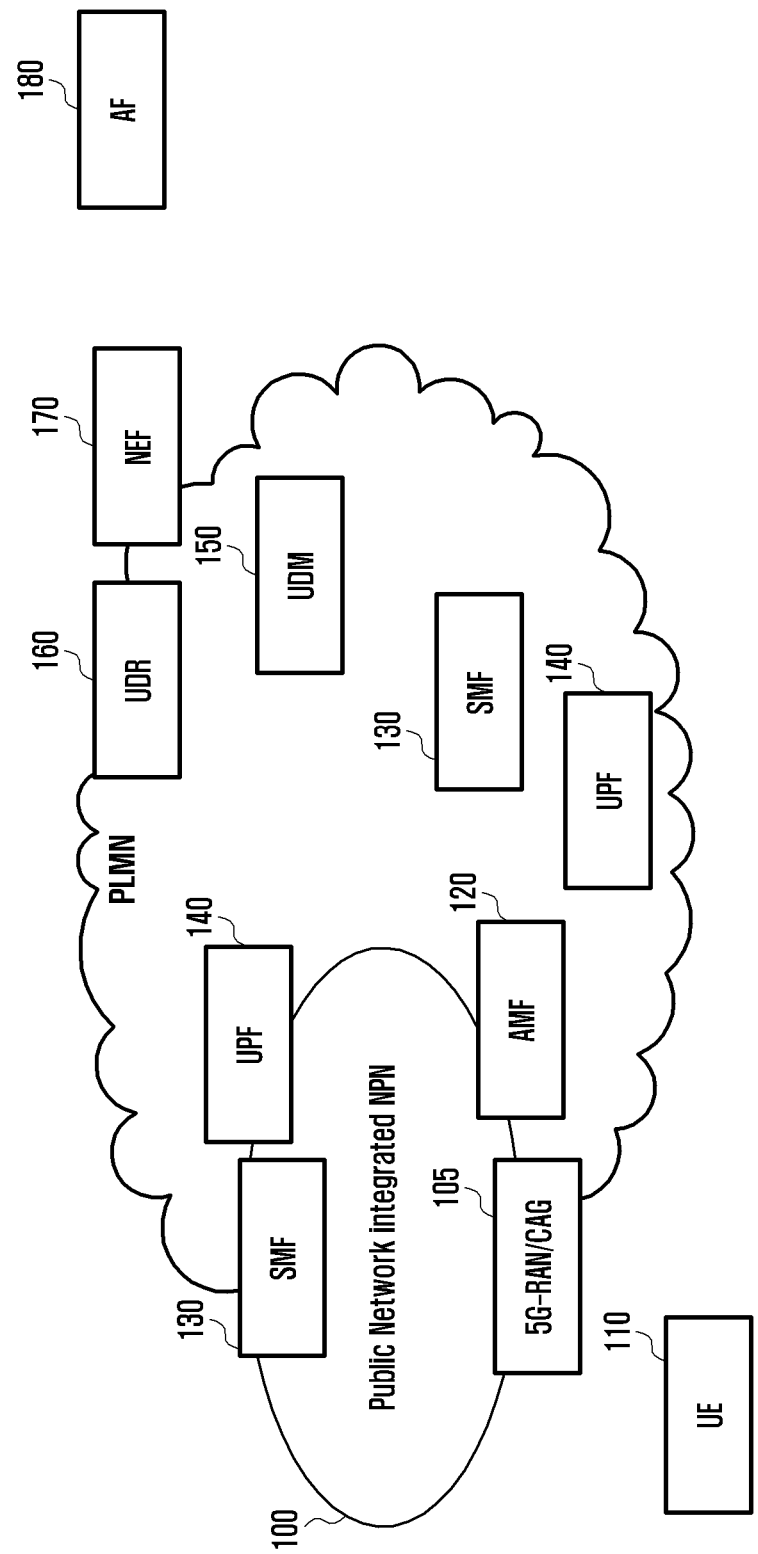
FIG. 1 is private communication network architecture having a public NW integrated NPN form.

Hereinafter, embodiments of the present disclosure are described in detail with reference to the accompanying drawings. Furthermore, in describing the present disclosure, a detailed description of a related known function or configuration will be omitted if it is deemed to make the gist of the present disclosure unnecessarily vague. Furthermore, terms to be described hereinafter have been defined by taking into consideration functions in the present disclosure, and may be different depending on a user, an operator's intention or practice. Accordingly, each term should be defined based on contents over the entire specification.

Advantages and characteristics of the present disclosure and a method of achieving advantages and characteristics will become more apparent from the embodiments described in detail in conjunction with the accompanying drawings. However, the present disclosure is not limited to the disclosed embodiments, but may be implemented in various different ways. The embodiments are provided to only complete the present disclosure and to allow those skilled in the art to fully understand the category of the present disclosure. The present disclosure is defined by the category of the claims. The same reference numerals will be used to refer to the same or similar elements throughout the specification.

FIG. 1 is a diagram illustrating private communication network architecture having a public NW integrated NPN (PNI-NPN, a PNI non-public network) form.

Referring to FIG. 1, the private communication network architecture having a public NW integrated NPN form has a form in which some of a public cellular network consisting of a data network name (DNN) or network slice instance(s) of the public cellular network is used for an NPN.

Accordingly, as in a public network, when accessing a private cellular network having the public NW integrated NPN form, a UE 110 transmits information of single-network slice selection assistance information (S-NSSAI(s)) to a core network (CN) in order to access a network slice instance(s), and selects an access and mobility management function (AMF) 120 capable of serving the S-NSSAI(s) transmitted by the UE 110. The selected AMF 120 selects a session management function (SMF) 130 corresponding to the S-NSSAI(s) information. The SMF provides a corresponding NPN service, such as by selecting a user plane function (UPF) 140 corresponding to the network slice instance(s) or a DNN.

Meanwhile, in order to control the access of the UE in a specific area or cell, an RAN 105 may use a method of broadcasting information of closed access group (CAG) IDs served by the RAN and accessing an RAN that broadcasts the CAG ID to only a UE that has subscribed to the CAG ID.

The CN includes entities, such as the AMF 120 responsible for mobility management and registration management of a UE, an authentication server function (AUSF) (not illustrated) responsible for authenticating a UE, unified data management (UDM) 150 managing subscription, a unified data repository (UDR) storing subscription data, an SMF 130 responsible for session management, a UPF 140 forwarding user data, an application function (AF) 180 that is an application server operated by a service provider for providing an NPN service outside the CN, and a network exposure function (NEF) 170 responsible for a role for exposing information of the CN to the outside of a network and providing information necessary for the CN by the AF.

Figure 2:
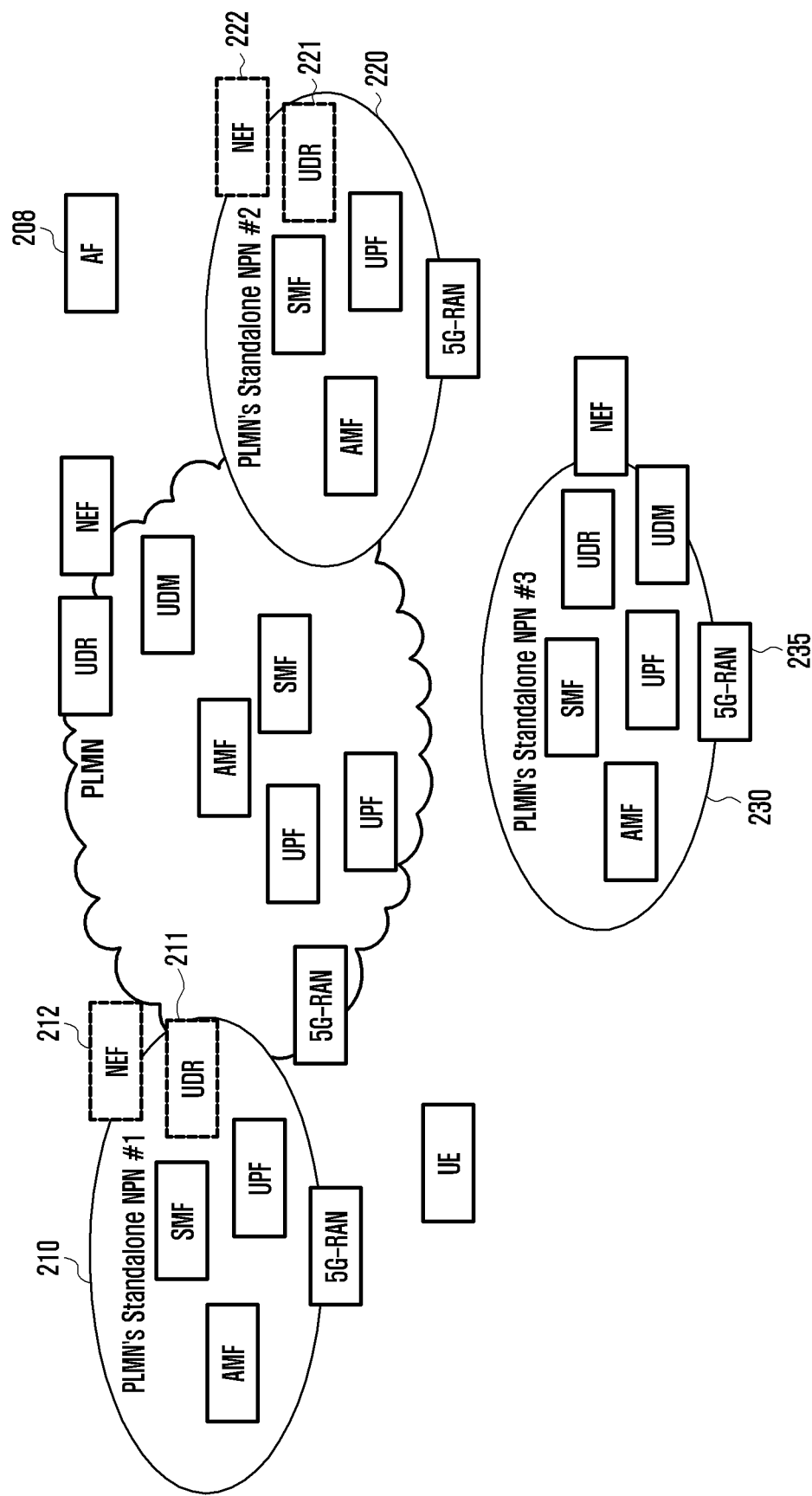
FIG. 2 is private communication network architecture having a standalone NPN form.

FIG. 2 is a diagram illustrating private communication network architecture having a standalone NPN (SNPN) form.

Referring to FIG. 2, there is a cellular network having a standalone NPN form, which is autonomously operated by a private cellular network without association with a public cellular network. Alternatively, there may be a cellular network having a standalone NPN form, which is operated by a public cellular network operator.

In FIG. 2, a standalone NPN #3 230 is a cellular network having standalone NPN form which is autonomously operated by a private cellular network without association with a public cellular network. Each of standalone NPN #1 210 and NPN #2 220 is a cellular network having a standalone NPN form which is operated by a public cellular network operator.

Like the standalone NPN #3 230, a standalone NPN autonomously operated by a private cellular network without association with a public cellular network has the same communication network architecture as a public cellular network. In this case, a 5G-RAN 235 may broadcast MCC information of a PLMN ID along with an NPN ID of the standalone NPN by setting the MCC information as a specific value. For example, an MCC 999 value is used.

In contrast, like the standalone NPN #1 210 and NPN #2 220, in the case of a cellular network having a standalone NPN form which is operated by a public cellular network operator, UDM 205 and an AUSF (not illustrated) uses an entity within a public cellular network. Furthermore, if a standalone NPN wants to have its own UDR or NEF according to circumstances, a UDR 211, 221 or an NEF 212, 222 may be located in the standalone NPN. In addition to the entities, the standalone NPN autonomously consists of separate independent entities as the same architecture as a public cellular network. In this case, a 5G-RAN broadcasts a PLMN ID of a corresponding public cellular network along with an NPN ID of the standalone NPN.

Meanwhile, an AF 208, that is, an application server operated by a service provider for providing an NPN service outside the CN, may provide information necessary for an NPN through an NEF or may be provided with information within an NPN.

According to an embodiment of the disclosure, NPN subscription data for a UE may include different information depending on a form of an NPN to be accessed by the UE.

That is, as in FIG. 1, in the case of an NPN having a public NW integrated NPN form, the contents of some or all of the following items are included in the NPN subscription data.

A subscription permanent identifier (SUPI) of a UE

A generic public subscription identifier (GPSI) of a UE

An allowed closed access group (CAG) list or a list of allowed CAG IDs which may be accessed by a UE. In this case, a PLMN ID may also be included.

Indication indicating whether a UE can be accessed only in an allowed CAG cell.

A list of single network slice selection assistance information (S-NSSAI) available for an NPN by a UE A data network name (DNN) available for an NPN by a UE A human readable network name available for an NPN by a UE. For example, a human readable network name corresponding to each S-NSSAI or each DNN, or mapping information between S-NSSAI and a human readable network name, or mapping information between a DNN and a human readable network name A period in which the NPN subscription data is valid:

For example, the period may indicate information on a period in which NPN subscription data is available (a hour or a day or a week or a month or a year), timing at which NPN subscription data expires, etc. For example, this value may be indicated to be always valid or to be not always valid by being inputted as 0 or a specific value, such as null. The valid period may be given with respect to all of NPN subscription data or may be given for each item of NPN subscription data. For example, the valid period may be set for each allowed CAG ID or for each DNN or for each S-NSSAI or for each Human readable network name.

An NPN subscription data change indicator. That is, the indicator indicates that NPN subscription data for a serving AMF or a UE needs to be updated because the NPN subscription data has been changed.

As in FIG. 2, in the case of an NPN having a standalone NPN form, the contents of some or all of the following items are included in the NPN subscription data.

A subscription permanent identifier (SUPI) of a UE

A generic public subscription identifier (GPSI) of a UE

A NPN ID list accessible to a UE. In this case, a PLMN ID may also be included.

Subscription credentials to be used for authentication upon access of a UE in a corresponding NPN for each NPN (or for each NPN ID).

A human readable network name of an NPN available for a UE.

A period in which the NPN subscription data is valid:

For example, the period may indicate information on a period in which NPN subscription data is available (a hour or a day or a week or a month or a year), timing at which NPN subscription data expires, etc. For example, this value may be indicated to be always valid or to be not always valid by being inputted as 0 or a specific value, such as null. The valid period may be given with respect to all of NPN subscription data or may be given for each item of NPN subscription data. For example, the valid period may be set for each NPN ID or for each PLMN ID+NPN ID or for each human readable network name.

An NPN subscription data change indicator. That is, the indicator indicates that NPN subscription data for a UE needs to be updated because the NPN subscription data has been changed.

In this document, NPN subscription data mentioned in describing embodiments means NPN subscription data for an NPN having a public NW integrated NPN form or a standalone NPN form.

Figure 3:
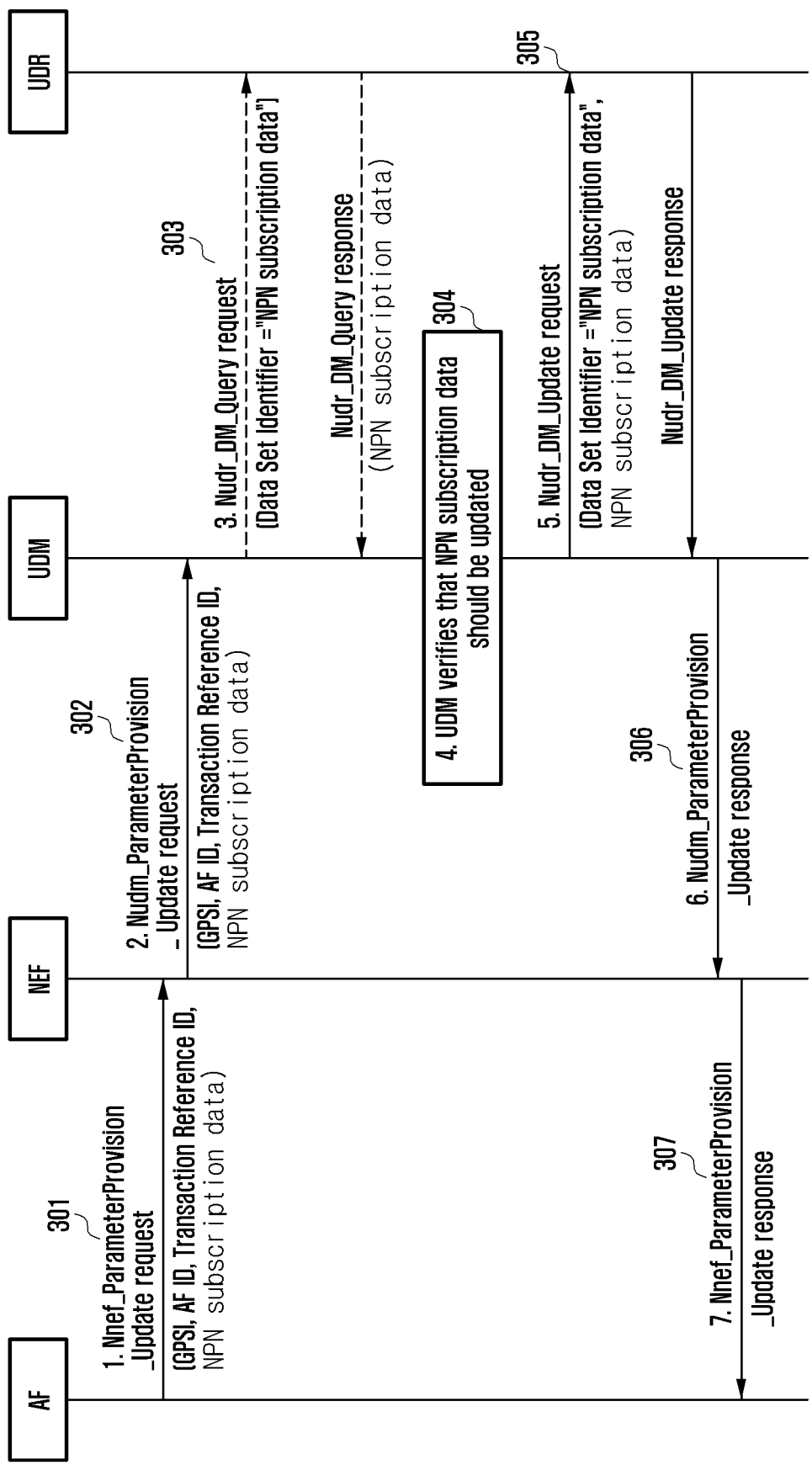
FIG. 3 is a diagram illustrating a procedure of adding NPN subscription data to UDM and a UDR.

FIG. 3 is a diagram illustrating a procedure of adding NPN subscription data to the UDM and the UDR according to an embodiment of the present disclosure.

If NPN subscription data of a UE is to be added or modified with respect to NPNs to be accessed by an AF operated by an NPN service provider, a smart factory operator, etc., in step 1, the AF transmits NPN subscription data to the NEF of a PLMN or the NEF of a corresponding NPN that operates a corresponding NPN. In this case, the AF may use an Nnef_ParameterProvision_Update request message (301). In this case, the Nnef_ParameterProvision_Update request message may include a GPSI or SUPI for providing notification that the message is for which UE in addition to the NPN subscription data, and may include an AF ID for indicating a source that provides the NPN subscription data or an AF-Service-Identifier indicating that the NPN subscription data is provisioned and may include a transaction reference ID previously shared between the AF and the NEF.

In step 2, the NEF that has received the Nnef_ParameterProvision_Update request message transmits the NPN subscription data to the UDM in order to update NPN subscription data information. In this case, the NEF may use a Nudm_ParameterProvision_Update request message may be used (302). In this case, the Nudm_ParameterProvision_Update request message may include a GPSI or SUPI for providing notification that the message is for which UE in addition to the NPN subscription data, and may include an AF ID for indicating a source that provides the NPN subscription data or an AF-Service-Identifier indicating that the NPN subscription data is provisioned and may include a transaction reference ID previously shared between the NEF and the UDM.

In step 3, the UDM that has received the Nudm_ParameterProvision_Update request message transmits an Nudr_DM_Query request message to the UDR in order to check whether it is necessary to update the UDR with respect to the received NPN subscription data (303). In this case, the Nudr_DM_Query request message may have a data set identifier set as "NPN subscription data" or corresponding information including a data set identifier(s) including NPN subscription data may be received from the UDR.

In step 4, the UDM identifies whether the NPN subscription data of the UDR needs to be updated (304). For example, when the NPN subscription data received from the UDR through step 3 is different from the NPN subscription data received from the NEF, the UDM identifies that the UDR is to be updated or does no perform step 3 or identifies that the UDR is updated with the NPN subscription data received from the NEF regardless of information received in step 3.

In step 5, the UDM transmits an Nudr_DM_Update request message to the UDR in order to update NPN subscription data (305). In this case, the Nudr_DM_Update request message has a data set identifier set as "NPN subscription data", includes a data set identifier(s) including the NPN subscription data, and includes information corresponding to NPN subscription data to be updated or a data set identifier.

Thereafter, the AF is notified of the results indicating that the update of the NPN subscription data has been successfully performed through steps 6 and 7 (306 and 307).

Meanwhile, the NPN subscription data stored in the UDM or the UDR is automatically destroyed when a valid period included in the information elapses. Alternatively, in order to destroy the NPN subscription data, the AF may notify the UDM of the deletion of the corresponding NPN subscription data by using a method of setting the contents of the NPN subscription data as "null" or indicating that a valid period included in the NPN subscription data is not always valid in steps 1 and 2. The UDM may set an Nudr_DM_Delete request message as a data set identifier="NPN subscription data" instead of the Nudr_DM_Update request message in step 5, and may transmit the Nudr_DM_Delete request message to the UDR so that the UDR deletes the NPN subscription data.

Figure 4:
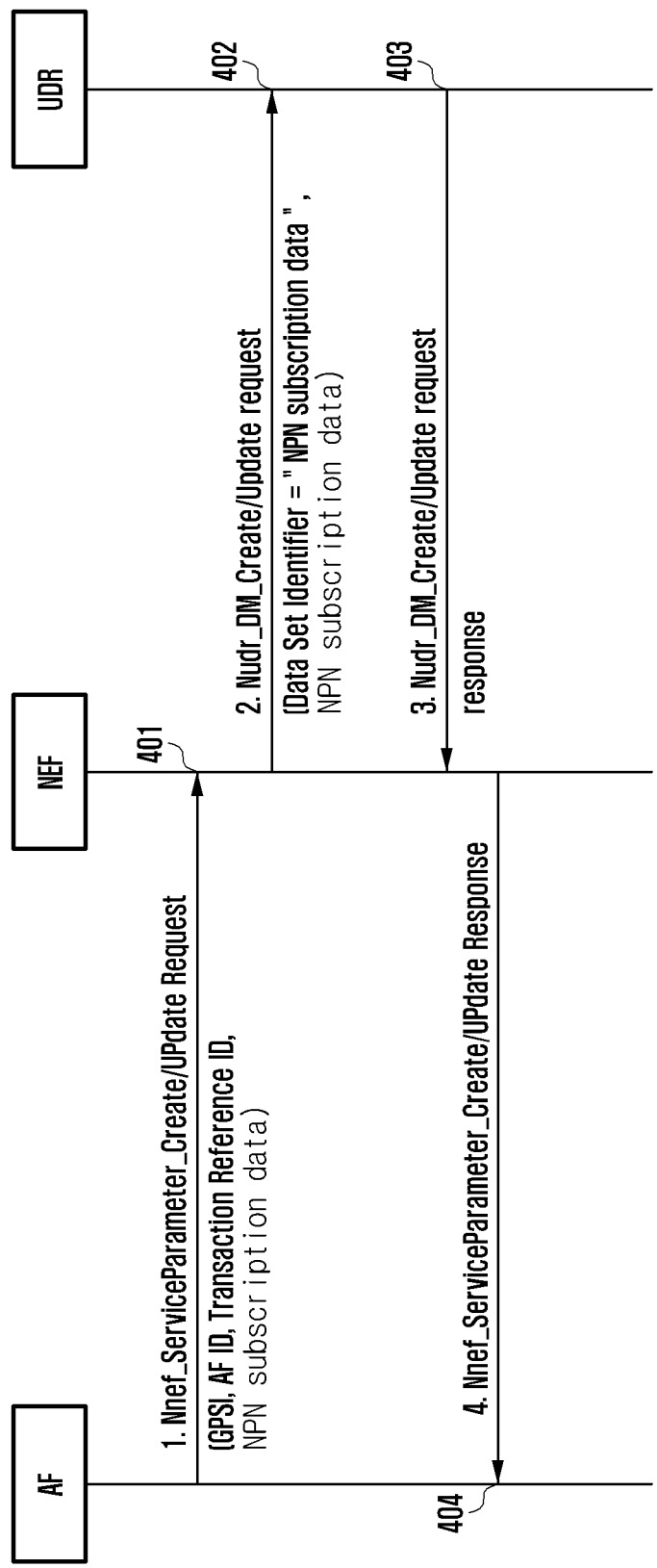
FIG. 4 is a diagram illustrating a procedure of adding NPN subscription data to a UDR.

FIG. 4 is a diagram illustrating a procedure of adding NPN subscription data to the UDR according to an embodiment of the present disclosure.

If NPN subscription data of a UE is to be added or modified with respect to NPNs to be accessed by an AF operated in an NPN service provider, a smart factory operator, etc., in step 1, the AF transmits NPN subscription data to the NEF of a PLMN or the NEF of a corresponding NPN that operates a corresponding NPN (401). In this case, NPN subscription data may be newly added using an Nnef_ServiceParameter_Create request message or the existing NPN subscription data may be updated using an Nnef_ServiceParameter_Update request message. In this case, the Nnef_ServiceParameter_Create request or the Nnef_ServiceParameter_Update request message may include a GPSI or SUPI for providing notification that the message is for which UE in addition to the NPN subscription data, may include an AF ID for indicating a source that provides the NPN subscription data or include an AF-Service-Identifier indicating that the NPN subscription data is provisioned, and may include a transaction reference ID previously shared between the AF and the NEF in the case of the Nnef_ServiceParameter_Create request message.

In step 2, the NEF that has received the Nnef_Service-Parameter_Create request message or the Nnef_ServiceParameter_Update request message directly transmits the NPN subscription data to the UDR in order to update NPN subscription data information. In this case, the NEF may use an Nudr_DM_Create request message or an Nudr_DM_Update request message (402). In this case, if NPN subscription data is newly added, the Nudr_DM_Create request message has a data set identifier set as "NPN subscription data" or includes a data set identifier(s) including the NPN subscription data or includes the NPN subscription data to be updated or information corresponding to a data set identifier.

If the existing NPN subscription data is updated, the Nudr_DM_Update request message has a data set identifier set as "NPN subscription data" or includes a data set identifier(s) including the NPN subscription data or includes the NPN subscription data to be updated or information corresponding to a data set identifier.

Thereafter, the AF is notified of the results indicating whether the update of the NPN subscription data has been successfully performed through step 3 and 4 (403 and 404).

Figure 5:
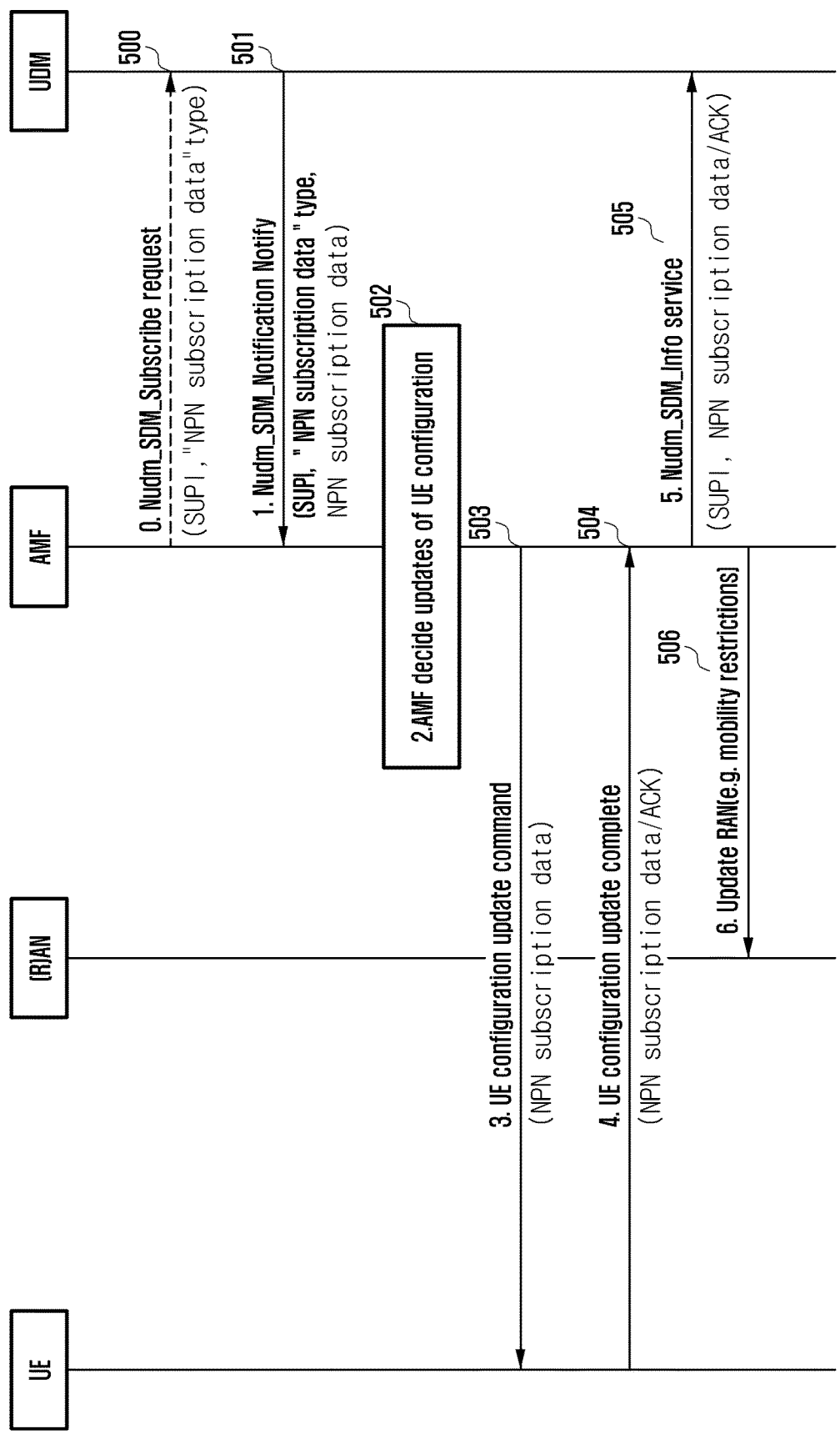
FIG. 5 is a diagram illustrating a procedure of provisioning NPN subscription data to a UE.

FIG. 5 is a diagram illustrating a procedure of provisioning NPN subscription data to a UE according to an embodiment of the present disclosure.

According to the embodiments described with reference to FIGS. 3 and 4, in the case of a UE registered with a network of a public network, that is, a PLMN, in the case that NPN subscription data of the UDM for the UE has been changed or NPN subscription data of the UDR has been changed and resultantly NPN subscription data of the UDM has been changed, if newly changed NPN subscription data is applied to the subscription of a corresponding PLMN, UE context of the AMF is updated with the corresponding NPN subscription data, and is provisioned to the UE. NPN subscription data for an NPN having a public NW integrated NPN form corresponds to such a case. Alternatively, NPN subscription data for an NPN having a standalone NPN form which is operated by a public network, that is, a PLMN operator, may correspond to such a case.

In step 0, if NPN subscription data has been updated, the AMF may request, from the UDM, a subscription service that requests notification (500). To this end, an Nudm_SDM_Subscribe request message includes SUPI in order to notify the UDM that the message corresponds to subscription for information of which UE. In order to request notification when NPN subscription data is changed, a subscription data type(s) including a subscription data type="NPN subscription data" or NPN subscription data may be included in the message.

As another method of recognizing, by the UDM, that NPN subscription data has been updated, if an NPN subscription data change indicator is included in subscription data of the UE, the UDM may recognize that the NPN subscription data has been updated.

According to the embodiments described with reference to FIGS. 3 and 4, when NPN subscription data of the UDM for a corresponding UE is changed, in step 1, the UDM notifies the AMF that NPN subscription data has been changed and transmits an Nudm_SDM_Notification Notify message in order to transmit the changed NPN subscription data (501). The Nudm_SDM_Notification Notify message includes SUPI in order to indicate that the message corresponds to subscription data for which UE. In order to provide notification that the NPN subscription data is included, updated NPN subscription data may be included in the message along with the subscription data type="NPN subscription data" or a subscription data type(s) including the NPN subscription data.

In step 2, the AMF that has received the updated NPN subscription data recognizes that a UE configuration needs to be updated (502), and transmits a UE configuration update command message to the UE as in step 3 when a state of the UE is a connected state (503). Alternatively, the AMF changes a state of the UE into the connected state through paging when the state of the UE is an idle state, or transmits the UE configuration update command message to the UE as in step 3 when the state of the UE is changed into the connected state in the case of a MICO mode UE. The UE configuration update command message includes the NPN subscription data. In step 4, the UE notifies the AMF that the NPN subscription data has been successfully delivered through a UE configuration update complete message (504).

Furthermore, in step 5, the AMF notifies the UDM that the NPN subscription data has been successfully delivered to the UE through an Nudm_SDM_Info service message (505). The Nudm_SDM_Info service message includes acknowledgement providing notification that the SUPI and NPN subscription data of the corresponding UE have been successfully delivered.

Meanwhile, in step 6, for a case where the UE applies newly changed NPN subscription data, the AMF transmits required updated information to an (R)AN being accessed by the UE (506). For example, in the case of NPN subscription data for an NPN having a public NW integrated NPN form, mobility restriction information in which allowed CAG list information, etc. has been updated may be included and delivered as updated information.

Figure 6:
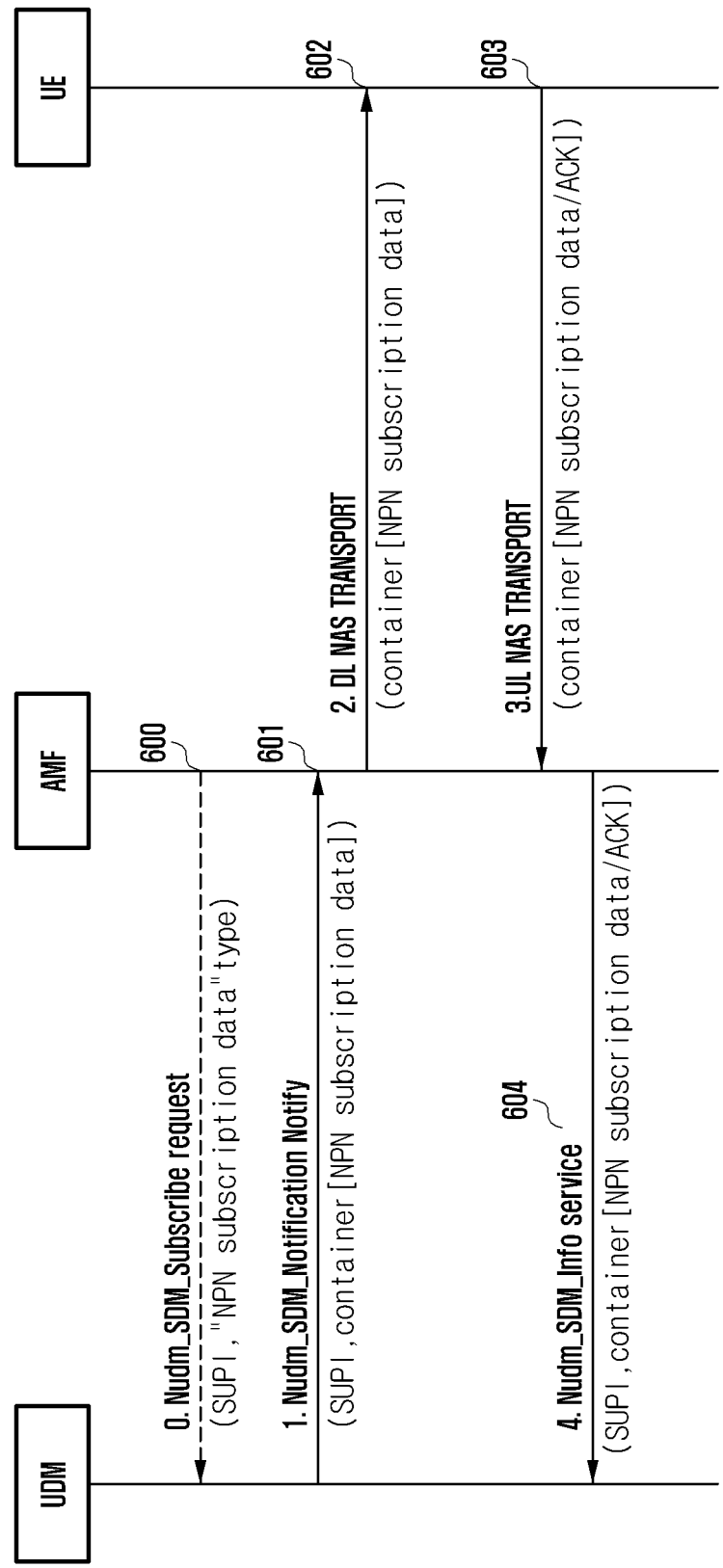
FIG. 6 is a diagram illustrating a procedure of provisioning NPN subscription data to a UE.

FIG. 6 is a diagram illustrating a procedure of provisioning NPN subscription data to a UE according to an embodiment of the present disclosure.

According to the embodiments described with reference to FIGS. 3 and 4, in the case of a UE registered with a network of a public network, that is, a PLMN, in the case that NPN subscription data of the UDM for the UE has been changed or that NPN subscription data of the UDM has been changed because NPN subscription data of the UDR has been changed, if newly changed NPN subscription data is not applied to the subscription of the corresponding PLMN, the corresponding NPN subscription data is provisioned to the UE. NPN subscription data for an NPN having a standalone NPN form operated by a public network, that is, an operator of a PLMN, may correspond to the corresponding NPN subscription data.

In step 0, the AMF may request, from the UDM, a subscription service that requests notification when NPN subscription data is updated in the UDM (600). To this end, an Nudm_SDM_Subscribe request message includes SUPI in order to notify the UDM that the message corresponds to subscription for information of which UE. In order to indicate a request for notification when the NPN subscription data is changed, a subscription data type="NPN subscription data" or a subscription data type(s) including the NPN subscription data may be included in the message.

As another method of recognizing, by the UDM, that NPN subscription data has been updated, if an NPN subscription data change indicator has been included in subscription data of a UE, the UDM may recognize that the NPN subscription data has been updated.

According to the embodiments described with reference to FIGS. 3 and 4, when NPN subscription data of the UDM for the corresponding UE is changed, in step 1, the UDM notifies the AMF that the NPN subscription data has been changed in order to provision the UE with the NPN subscription data, and transmits an Nudm_SDM_Notification Notify message in order to transmit the changed NPN subscription data (601). The Nudm_SDM_Notification Notify message includes SUPI in order to indicate that the NPN subscription data is subscription data for which UE. Furthermore, the UDM transmits the Nudm_SDM_Notification Notify message to the AMF along with the SUPI by inserting updated NPN subscription data into a transparent container for transmitting the NPN subscription data to the UE along with a subscription data type="NPN subscription data" or a subscription data type(s) including NPN subscription data.

In step 2, the AMF that has received the Nudm_SDM_Notification Notify message recognizes that the information included in the transparent container needs to be delivered to the corresponding UE. When a state of the UE is a connected state, the AMF transmits a DL NAS Transport message to the UE by carrying, on the DL NAS Transport message, the transparent container including the NPN subscription data (602). Alternatively, the AMF changes a state of the UE into the connected state through paging when the state of the UE is an idle state, or transmits the DL NAS Transport message to the UE when a state of the UE is changed into the connected state in the case of a MICO mode UE. In step 3, the UE notifies the AMF that the transparent container including the NPN subscription data has been successfully delivered through an UL NAS Transport message (603).

Furthermore, in step 4, the AMF notifies the UDM that the transparent container including the NPN subscription data has been successfully delivered to the UE through an Nudm_SDM_Info service message (604). The Nudm_SDM_Info service message includes acknowledgement providing notification that the transparent container including the SUPI and NPN subscription data of the corresponding UE has been successfully delivered.

Figure 7:
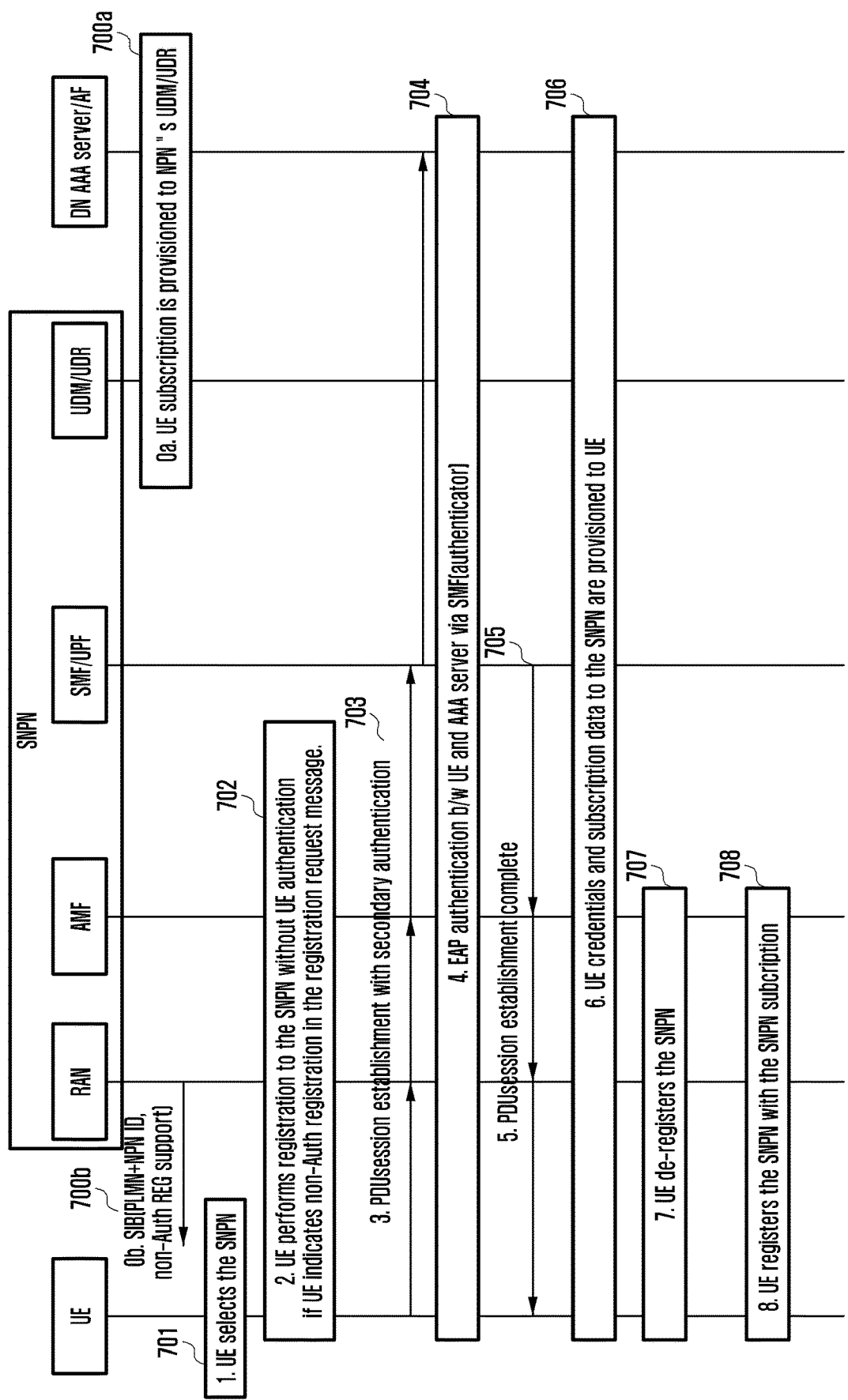
FIG. 7 is a diagram illustrating a procedure of obtaining, by a UE, updated NPN subscription data when the UE accesses a standalone NPN autonomously operated by a private cellular network without association with a public cellular network.

FIG. 7 is a diagram illustrating a procedure of obtaining, by a UE, updated NPN subscription data when the UE accesses a standalone NPN autonomously operated by a private cellular network without association with a public cellular network according to an embodiment of the present disclosure.

According to the embodiments described with reference to FIGS. 3 and 4, when NPN subscription data of which UE is changed in the UDM or UDR of a standalone NPN autonomously operated by a private cellular network without association with a public cellular network, if the UE has subscription to the standalone NPN, the UE may obtain the changed NPN subscription data in a registration process or through the method of FIG. 5 after registration.

However, if the UE does not have subscription to the standalone NPN, but the standalone NPN supports non-authentication access, the UE may obtain NPN subscription data by accessing the standalone NPN through non-authentication access according to the procedure of FIG. 7. In step 0a, according to the embodiments described with reference to FIGS. 3 and 4, the AF provides changed NPN subscription data of a UE to the UDM or UDR of a standalone NPN autonomously operated by a private cellular network without association with a public cellular network (700a).

Meanwhile, the standalone NPN may support non-authenticated registration, that is, non-authentication network registration, in order to provide a method for obtaining, by a UE that has not yet obtained NPN subscription, the required NPN subscription by accessing the standalone NPN.

In step 0b, the RAN of the standalone NPN (SNPN) broadcasts a PLMN ID (MCC=999) and an NPN ID in order to notify UEs of the NW identification of the SNPN. The broadcasting may include indication (or restricted local operator services (RLOS) indication) indicating that the SNPN supports non-authentication network registration (700b).

If the UE does not have a credential and subscription for the SNPN, when the UE wants access to the SNPN and recognizes that the SNPN supports non-authentication network registration, the UE NW-selects the SNPN (701). The UE may find out whether the SNPN supports non-authentication network registration from the "indication indicating that the SNPN supports non-authentication network registration" broadcasted by the RAN of the SNPN or may always identify that the SNPN supports non-authentication network registration in the case of MCC=999.

The UE selects the SNPN. In step 2, for the non-authentication network registration with the SNPN, the UE includes RLOS indication in a registration request message, transmits the registration request message to the AMF, and completes the non-authentication network registration (702). In step 3, the UE requests a PDU session. In this case, a request message may include the RLOS indication (703). Meanwhile, the AMF that has received the PDU session request message selects an SMF supporting secondary authentication and forwards the message to the selected SMF. When recognizing that secondary authentication is necessary, the SMF that has received the PDU session request message discovers a data network authentication authorization accounting (DN AAA) server and starts an authentication process along with the discovered DN AAA server.

As a method of recognizing that the secondary authentication is necessary, the SMF refers to the RLOS indication included in the PDU session request message or indicates that the secondary authentication is necessary for the PDU session by including that a state of the UE is an RLOS indication or un-authenticated state when the AMF transmits, to the SMF, an Nsmf_PDUSession_CreateSMContext Request message by including the PDU session request message received from the non-authentication network-registered UE in the Nsmf_PDUSession_CreateSMContext Request message.

In step 4, the UE performs an extensible authentication protocol (EAP) authentication process along with the DN AAA server through the SMF (704). When the EAP authentication is successfully finished, in step 5, the UE terminates the establishment of the PDU session (705). In the EAP authentication step of step 4, the UE previously shares a credential by which an SNPN operator that operates the DN AAA server and a smart factory can be mutually authenticated. For example, the SNPN operator and the smart factory may be authenticated using an ID/Password or a certificate.

In step 6, the UE accesses an AF or application server from which the SNPN subscription data and credential of the UE can be downloaded through the generated PDU session, downloads the SNPN subscription data and credential of the UE, and installs the SNPN subscription data and the credential therein (706).

In step 7, the UE in which the new SNPN subscription data and the credential have been installed performs de-registration on an SNPN that is now accessed in order to access the SNPN by using the newly downloaded SNPN subscription data and credential (707). In step 8, the UE access the SNPN again by using the newly assigned SNPN subscription data and credential (708).

Figure 8:
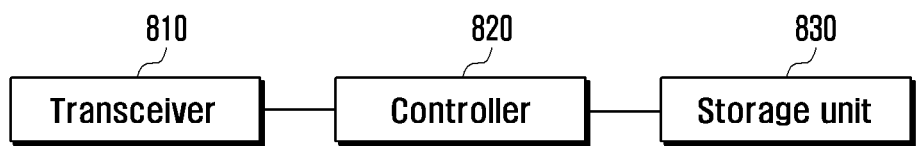
FIG. 8 is a diagram illustrating a structure of a UE according to an embodiment of the present disclosure.

FIG. 8 is a diagram illustrating a structure of a UE according to an embodiment of the present disclosure.

Referring to FIG. 8, the UE may include a transceiver 810, a controller 820, and a storage unit 830. In the present disclosure, the controller 820 may be defined as a circuit or an application-specific integrated circuit or at least one processor.

The transceiver 810 may transmit and receive signals to and from another network entity. The transceiver 810 may receive system information from a base station, for example, and may receive a synchronization signal or a reference signal.

The controller 820 may control an overall operation of the UE according to an embodiment proposed in the present disclosure. For example, the controller 820 may control a signal flow between the blocks so that an operation according to the described flowchart is performed.

The storage unit 830 may store at least one of information transmitted and received through the transceiver 810 and information generated through the controller 830.

Figure 9:
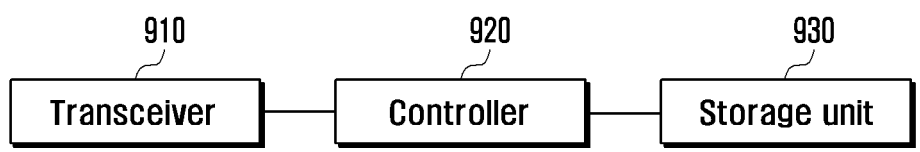
FIG. 9 is a diagram illustrating a structure of a network entity according to an embodiment of the present disclosure.

FIG. 9 is a diagram illustrating a structure of a network entity according to an embodiment of the present disclosure.

The network entity illustrated in FIG. 9 means any one of the network entities illustrated in FIGS. 1 to 7. Referring to FIG. 9, the network entity may include a transceiver 910, a controller 920, and a storage unit 930. In the present disclosure, the controller 920 may be defined as a circuit or an application-specific integrated circuit or at least one processor.

The transceiver 910 may transmit and receive signals to and from a UE or another network entity. The transceiver 910 may transmit system information to a UE, for example, and may transmit a synchronization signal or a reference signal.

The controller 920 may control an overall operation of the network entity according to the embodiment proposed in the present disclosure. For example, the controller 920 may control a signal flow between the blocks so that an operation according to the described flowchart is performed.

The storage unit 930 may store at least one of information transmitted and received through the transceiver 910 and information generated through the controller 920.

The invention claimed is:

1. A method performed by a terminal in a mobile communication system, the method comprising:
   selecting a first standalone non-public network (SNPN) to be accessed based on information on the SNPN, the information being broadcasted from a base station;
   transmitting, to a network entity of the first SNPN, a registration request message for accessing the selected first SNPN;
   transmitting, to the network entity, a packet data unit (PDU) session request message to request establishment of a PDU session with the first SNPN;
   receiving, from the network entity, SNPN subscription data including a subscription credential of the terminal for a second SNPN through the PDU session established in response to the PDU session request message;
   releasing registration with the first SNPN;
   selecting the second SNPN to be accessed based on the received SNPN subscription data; and
   performing authentication on the second SNPN based on the subscription credential to be registered with the second SNPN.

2. The method of claim 1, wherein the PDU session request message includes a restricted local operator services (RLOS) indicator, and
   wherein the PDU session is established based on the PDU session request message.

3. The method of claim 1, wherein the PDU session is established after the UE is authenticated by a network authentication server.

4. The method of claim 1, wherein the network entity includes an access and mobility management function (AMF).

5. A method performed by a network entity of a first standalone non-public network (SNPN) in a mobile communication system, the method comprising:
   receiving, from a terminal, a registration request message for accessing the first SNPN;
   completing registration of the terminal based on the registration request message;
   receiving, from the terminal, a packet data unit (PDU) session request message to request establishment of a PDU session with the first SNPN;
   establishing the PDU session in response to the PDU session request message;
   transmitting, to the terminal, SNPN subscription data including a subscription credential of the terminal for a second SNPN through the PDU session established in response to the PDU session request message; and
   releasing the registration of the terminal,
   wherein the terminal selects the first SNPN to be accessed based on information on the first SNPN, which is broadcasted from a base station of the first SNPN, and
   wherein the terminal selects the second SNPN to be accessed based on the SNPN subscription data transmitted to the terminal and is registered with the second SNPN by performing authentication on the second SNPN based on the subscription credential.

6. The method of claim 5, wherein the PDU session request message includes a restricted local operator services (RLOS) indicator, and
   wherein the PDU session is established based on the PDU session request message.

7. The method of claim 5, wherein establishing the PDU session comprises establishing the PDU session when the terminal is authenticated by a network authentication server, and
   wherein the network entity includes an access and mobility management function (AMF).

8. A terminal for a mobile communication system, the terminal comprising:
   a transceiver configured to transmit and receive signals; and
   a controller coupled with the transceiver and configured to:
   select a first standalone non-public network (SNPN) to be accessed based on information on the SNPN, the information being broadcasted from a base station,
   transmit, to a network entity of the first SNPN, a registration request message for accessing the selected first SNPN,
   transmit, to the network entity, a packet data unit (PDU) session request message to request establishment of a PDU session with the first SNPN,
   receive, from the network entity, SNPN subscription data including a subscription credential of the terminal for a second SNPN through the PDU session established in response to the PDU session request message, release registration with the first SNPN, select the second SNPN to be accessed based on the received SNPN subscription data, and perform authentication on the second SNPN based on the subscription credential to be registered with the second SNPN.

9. The terminal of claim 8, wherein the PDU session request message includes a restricted local operator services (RLOS) indicator, and wherein the PDU session is established based on the PDU session request message.

10. The terminal of claim 8, wherein the PDU session is established after the UE is authenticated by a network authentication server.

11. The terminal of claim 8, wherein the network entity includes an access and mobility management function (AMF).

12. A network entity of a first standalone non-public network (SNPN) for a mobile communication system, the network entity comprising:

a transceiver configured to transmit and receive signals; and a controller coupled with the transceiver and configured to:

receive, from a terminal, a registration request message for accessing the first SNPN, complete registration of the terminal based on the registration request message, receive, from the terminal, a packet data unit (PDU) session request message to request establishment of a PDU session with the first SNPN, establish the PDU session in response to the PDU session request message, transmit, to the terminal, SNPN subscription data including a subscription credential of the terminal for a second SNPN through the PDU session established in response to the PDU session request message, and release the registration of the terminal, wherein the terminal selects the first SNPN to be accessed based on information on the first SNPN, which is broadcasted from a base station of the first SNPN, and wherein the terminal selects the second SNPN to be accessed based on the SNPN subscription data transmitted to the terminal and is registered with the second SNPN by performing authentication on the second SNPN based on the subscription credential.

13. The network entity of claim 12, wherein the PDU session request message includes a restricted local operator services (RLOS) indicator, and wherein the PDU session is established based on the PDU session request message.

14. The network entity of claim 12, wherein the controller is configured to establish the PDU session when the terminal is authenticated by a network authentication server.

15. The network entity of claim 12, wherein the network entity includes an access and mobility management function (AMF).

* * * * *